Dec. 25, 1962  D. L. FRANCESCON  3,069,793
CREDIT CARD AND BLANK FOR USE IN PREPARING SAME
Filed Aug. 8, 1960
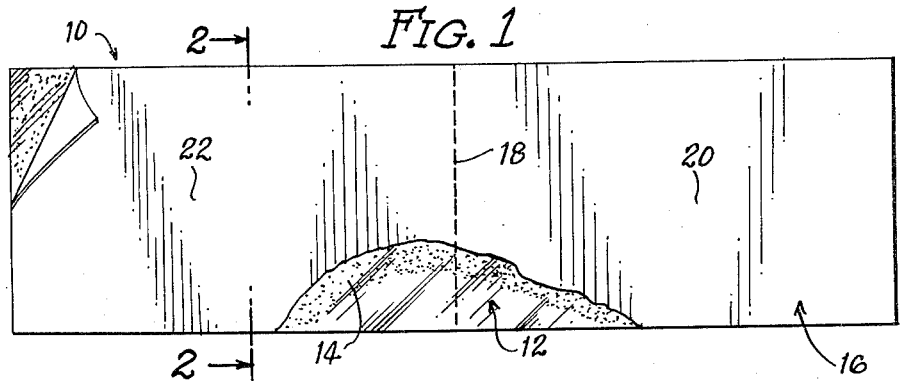
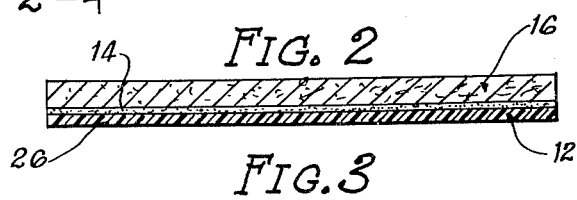
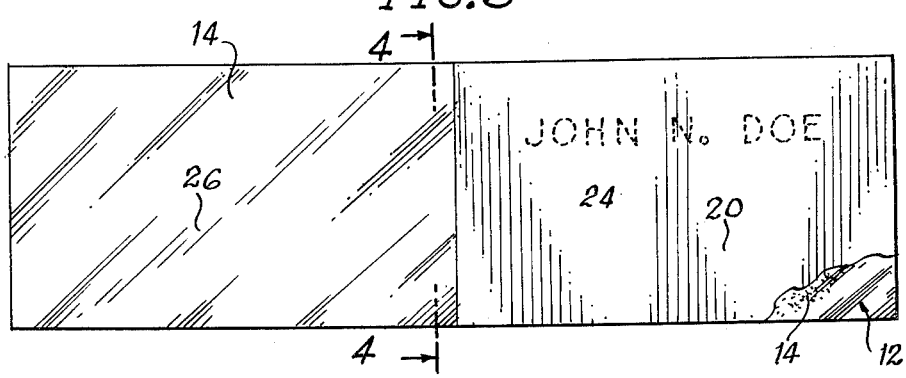
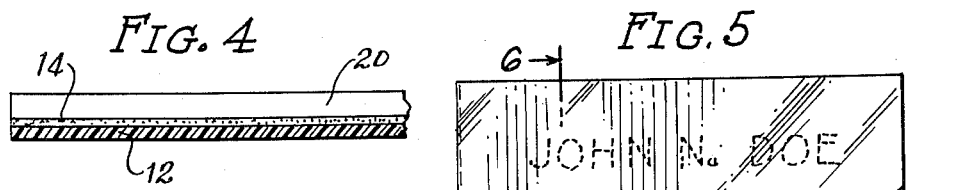
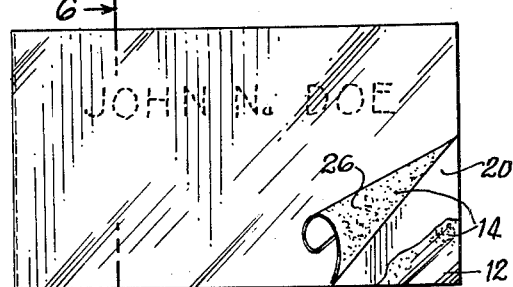
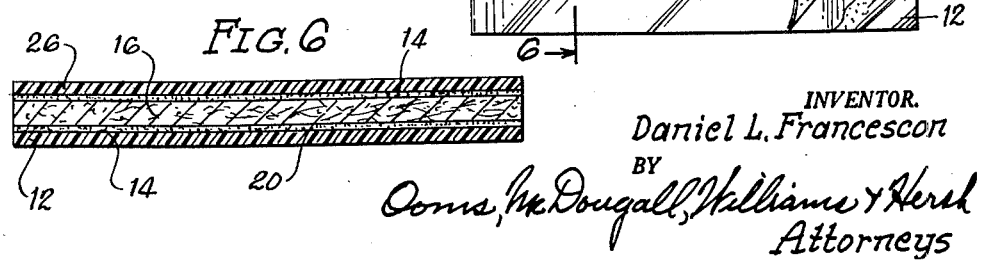
INVENTOR.
Daniel L. Francescon
BY
Ooms, McDougall, Williams & Hersh
Attorneys Patented Dec. 25, 1962

3,069,793
CREDIT CARD AND BLANK FOR USE IN PREPARING SAME
Daniel L. Francescon, Oak Park, Ill., assignor to American Decalcomania Co., Chicago, Ill., a corporation of Illinois
Filed Aug. 8, 1960, Ser. No. 48,182
10 Claims. (Cl. 40—2.2)

This invention relates to a new and improved credit card and assembly for use in the preparation of same and it relates more particularly to a structure for use in the assembly of a credit card.

Credit cards have come into extensive use in the payment of various commodities, products and services and in various banking operations, such as in the cashing of checks, making deposits, and the like. For the most part, these credit cards constitute paper, plastic or cellulosic structures which identify the agency from which the service is made available and the person to whom the credit card is issued and it also provides space for the signature of the person for identification thereof. The appearance on the face of the card of the agency and the signature of the person is undesirable because it permits others inadvertently acquiring possession of the card to make improper use thereof with a resultant loss either to the agency or to the person. Such possibilities for misuse by identification of the agency and by identification of the signature of the user provide an ever-present danger since such credit cards are easily lost or otherwise often find their way into the possession of an unscrupulous person, such that misuse becomes quite frequent.

Further, the appearance of the signature on the face of the card exposes the signature to wear and tear including moisture and abrasion whereby the signature is subject to change, deterioration or obliteration, or else becomes dirty to render the credit card unattractive and otherwise to interfere with the proper identification of the person whereby it becomes undesirable or unacceptable for use.

It is an object of this invention to produce a new and improved structure for use in the preparation of a credit card which is free of the objectionable features previously pointed out.

Another object is to produce a new and improved structure for use in the preparation of a credit card which does not show the agency or the person or the signature thereof and is therefore not identifiable by others who might come into possession of the card thereby to minimize the possibilities of making unauthorized use thereof.

A further object of this invention is to produce a new and improved credit card and construction for use in the manufacture of same wherein the face of the card is protected to prevent change in appearance or in the inscription thereon but without interfering with the visibility thereof.

These and other objects and advantages of this invention will hereinafter appear and, for purposes of illustration, but not of limitation, an embodiment of the invention is shown in the accompanying drawing, in which:

FIG. 1 is a top plan view of an assembly which may be used in the preparation of a credit card embodying the features of this invention;

FIG. 2 is a sectional view taken along the line 2—2 of FIG. 1;

FIG. 3 is a top plan view of the assembly shown in FIG. 1 in which the signature of the user is provided on one portion of the assembly while the other portion is in condition to be laminated to the face thereof for protection;

FIG. 4 is a sectional view taken along the line 4—4 of FIG. 3;

FIG. 5 is a top plan view of a credit card in its final assembly, and

FIG. 6 is a sectional view taken along the line 6—6 of FIG. 5.

Referring now to the blank 10 of which the credit card is formed, the numeral 12 represents a thin film of material which is at least translucent and preferably transparent and which is dimensioned to have a width corresponding to the width of the card and a length corresponding to about twice the length of the card. The film 12 is provided on its upper surface with a continuous coating 14 of a pressure-sensitive adhesive and the adhesive layer 14 is covered by a strip of sheet material 16 dimensioned to correspond to the width of the card and about twice the length thereof substantially completely to overlie the pressure-sensitive coated film 12. The strip 16 is subdivided crosswise by a score line 18 or other demarcation to enable separation of the strip for subdivision into one section 20 which functions as the signature card and another section 22 which functions as a backing sheet in the assembly to protect the underlying pressure-sensitive adhesive layer 14 on the surface of the film 12. Thus the film 12 functions as a continuous member on which the separable sections of the strip of sheet material are supported in the blank arrangement.

In use, the signature, indicated by the broken lines 24 in FIG. 3, is written in ink, pencil or the like onto the exposed surface of the half section 20 of the strip material. After the signature of the person has been inscribed onto the exposed surface of the card section, the other section is removed, as by peeling from the other half of the pressure-sensitive adhesive coated film to release the film which is then folded over onto the exposed surface of the card section 20 and onto which it is pressed firmly to become bonded to the surface for lamination therewith. Thus the freed section 26 of the film overlies the surface of the card 20 on which the signature 24 appears completely to cover the surface with a film which prevents access to the surface without removal of the film thereby to prevent change of signature or discoloration or deterioration of the surface. Removal of the film for access to the surface can be indicated by separation of the portions of the card and/or portions of the signature by removal with the pressure-sensitive adhesive on the film thereby to indicate tampering and to invalidate the card.

It is preferred to form the film backing 12 of a synthetic resinous or polymeric material which is relatively unstretchable to minimize distortion upon removal of the backing 22 whereby the freed section will coincide with the adjacent card section 20 to which it is laminated. It is also desirable to make use of a synthetic polymeric or resinous material which is insoluble in moisture or other elements coming into contact there within use.

For this purpose, use can be made of film stock of such synthetic resinous or polymeric materials as the polyesters (Mylar), polyvinylidene chloride (Saran), polyvinyl chloride, polyvinyl acetate, polyvinyl acetal, polymethylmethacrylate, polyethylene, chlorinated rubber, or such materials as regenerated cellulose, cellophane, cellulose acetate, cellulose propionate and the like. Film stock up to 30 mils in thickness can be employed but it is preferred to make use of a film of 1–5 mils in thickness.

As the signature card and backing, use can be made of conventional card stock formed of cellulosic fibers, preferably with a high finish on the surface adjacent the pressure-sensitive coating to permit separation without picking off the adhesive. Instead, use can be made of sheet stock formed of metal or plastics, preferably processed to provide a matte finish to enable inscription of a signature and the like on the surface thereof.

The card is preferably, though not necessarily, fabricated of a material having greater thickness and stiffness than the transparent film 12. In practice, use can be made of card stock up to 0.1 inch in thickness but it is preferred to make use of card stock having a thickness of from 0.003 to 0.01 inch.

Another important concept of this invention resides in the concealment of the signature and/or the identification of the agency for which the card is issued. For this purpose, the surface of the card can be left completely blank or without such identification visible on the surface thereof. The inscription, such as the signature, can then be written or printed onto the surface with invisible ink or preferably with a material which is substantially invisible in daylight but which becomes visible under black light or ultra-violet light. For such purpose, use is made of a fluorescent material which converts light waves of shorter length, such as light waves in the ultra-violet range, into light waves of greater length in the visible range for readability under ultra-violet light.

In practice, the signature which is relatively invisible in daylight but visible under black light can be provided onto the surface of the card by the use of a transfer sheet having a coating on one side containing fluorescent material which is transferred in response to pressure and which transfers from the transfer sheet to the card surface when the sheet is positioned with the coated side on the card surface and the person writes the signature on the top side of the transfer sheet.

After the relatively invisible signature has been applied, the adjacent section of the car stock is removed and the freed section of the film is folded over for lamination onto the exposed surface of the signed card. Thus the signed card has no visible inscription on the surface which would indicate the agency for which the card is issued nor the signature of the user, yet the signature can be made clearly visible under black light or ultra-violet light made available at the various stations of use. Thus, when the card is found or inadvertently comes into possession of another, said other will have no idea as to the usage which can be made of the card nor the signature which appears thereon and therefore cannot be used by such strangers or unauthorized persons inadvertently or otherwise coming into possession of the credit card.

When use is made of such invisible or fluorescent material for identification, it is desirable to make use of a film 12 formed of a synthetic polymeric or resinous material which is relatively free of color and through which light waves in the visible and ultra-violet range may freely pass.

Any conventional pressure-sensitive adhesive can be used for the coating 14 but it is desirable to make use of a pressure-sensitive adhesive which is relatively clear in a thin film and which remains bonded to the film 12 in preference to the paper card stock to enable separation of the unsigned section of the card stock without picking off adhesive from the surface of the film. The following is representative of a suitable pressure-sensitive adhesive which finds use with Mylar film preferred in the practice of this invention:

33 parts by weight vinyl ether polymer (EDBM—Bakelite Corporation)
70 parts by weight vinyl ether polymer (EHBC—Bakelite Corporation)
10 parts by weight hydrogenated rosin ester (Staybelite #10—Hercules Powder Company)
0.5 part by weight antioxidant (American Cyanamid 2246)
250 parts by weight naphtha It will be apparent from the foregoing that I have provided a new and improved blank for use in the preparation of credit cards which avoids difficulties heretofore encountered in the misuse of cards which inadvertently come into possession of others. It will be apparent that the credit card of this invention can be dispensed for unlimited usage in various applications for receiving the signature of the user and for lamination after the signature is applied to produce an assembly which is not subject to tampering, change or deterioration and thereby prevents unauthorized usage to be made of the card.

It will be understood that changes may be made in the details of construction, arrangement and operation without departing from the spirit of the invention, especially as defined in the following claims.

I claim:
1. A credit card assembly comprising a card adapted to receive inscriptions on the exposed top surface thereof, a thin flexible film of a translucent material underlying the card and dimensioned to correspond to the width of the card and about twice the length thereof with the card positioned to one side of the center line of the film, a pressure-sensitive adhesive layer covering the entire surface of the film to adhere the back side of the card to the film on said one side, and a removable protective backing covering the exposed portion of the pressure-sensitive adhesive coated film and releasably bonded thereto by the pressure-sensitive adhesive.

2. A credit card as claimed in claim 1 in which the thin flexible film is a transparent film of a plastic material.

3. A credit card as claimed in claim 1 in which the thin flexible film is a film through which light waves in the visible and ultra-violet range can pass.

4. A credit card assembly comprisnig a card of rectangular shape adapted to receive inscriptions on the top surface thereof, a thin flexible film of translucent material underlying the card and of rectangular shape having a width corresponding to the width of the card and a length which is about twice the length of the card with the card positioned to one side of the center line of the film, a pressure-sensitive adhesive layer on the entire top surface of the film to adhere the back side of the card to the film on said one side, and a removable protective backing covering the exposed portions of the pressure-sensitive adhesive coated film and releasably bonded thereto by the pressure-sensitive adhesive.

5. A credit card as claimed in claim 4 in which the protective backing is of a dimension corresponding to the dimension of the card.

6. A credit card as claimed in claim 4 in which the protective backing is joined to the card with a line of separation therebetween.

7. A credit card as claimed in claim 4 in which the backing and card are integrally joined and formed of the same piece of material with a line of separation extending along said center line for separation of the backing portion from the card portion.

8. The method of preparing a credit card with the construction of the assembly claimed in claim 1 comprising the steps of inscribing the desirable information upon the exposed top surface of the card portion, stripping the protective backing from the pressure-sensitive adhesive coated film, folding the freed portion of the film onto the exposed top surface of the card to bring the pressure-sensitive adhesive coating into intimate contact with the exposed top surface of the card to laminate the film onto the card completely to enclose the card within the film.

9. A credit card comprising a card, a continuous film of flexible, translucent material dimensioned to extend across the bottom side of the card, about one edge and across the top side of the card, a layer of pressure-sensitive adhesive on the surface of the film facing the card to laminate the film onto the bottom and top sides of the card, and an inscription on the top surface of the credit card.

10. A credit card comprising a card of rectangular shape, a continuous film of flexible, transparent material dimensioned to have a width corresponding to the width of the card and a length twice the length of the card to extend across the bottom side of he card, about one edge and across the top side of the card, a layer of pressure-sensitive adhesive laminating the film onto the top side and bottom side of the card, and an inscription on the top side of the card beneath the film.

References Cited in the file of this patent

UNITED STATES PATENTS

| | | |
|---|---|---|
| 1,502,137 | De Foreest et al. | July 22, 1924 |
| 2,156,018 | Humphner | Apr. 25, 1939 |
| 2,262,492 | Farrell | Nov. 11, 1941 |
| 2,500,612 | Krogh | Mar. 14, 1950 |
| 2,767,495 | Harris | Oct. 23, 1956 |
| 2,897,962 | Zackheim | Aug. 4, 1959 |